United States Patent [19]
Cho

[11] Patent Number: 5,479,976
[45] Date of Patent: Jan. 2, 1996

[54] THREE-CHAMBER TIRE

[76] Inventor: Woon-Je Cho, 821-10 Glen Everest Rd., Scarborugh, Ontario, Canada, MIN 1J4

[21] Appl. No.: 359,429

[22] Filed: Dec. 20, 1994

[51] Int. Cl.⁶ .............................. B60C 17/01; B60C 5/22; B60C 17/04
[52] U.S. Cl. ...................... 152/518; 152/342.1; 152/520
[58] Field of Search .................................... 152/516, 518, 152/519, 520, 157, 158, 339.1, 340.1, 341.1, 342.1, 325, 329

[56] References Cited

U.S. PATENT DOCUMENTS

| | | | |
|---|---|---|---|
| 638,589 | 12/1899 | Munger | 152/158 |
| 2,216,368 | 10/1940 | Hollingshead | 152/342.1 |
| 4,280,546 | 7/1981 | Mistretta | 152/516 |
| 4,305,444 | 12/1981 | Suris | 152/520 X |
| 5,035,273 | 7/1991 | Ruvio | 152/518 X |
| 5,301,729 | 4/1994 | Bair | 152/518 X |

FOREIGN PATENT DOCUMENTS

| | | | |
|---|---|---|---|
| 2579142 | 3/1985 | France | 152/518 |

*Primary Examiner*—Michael W. Ball
*Assistant Examiner*—David W. Reed
*Attorney, Agent, or Firm*—Armstrong, Westerman, Hattori, McLeland & Naughton

[57] ABSTRACT

A three-chamber tire comprises a tire body including a bead mounted to a rim and an interior hollow space therewithin to form a service chamber; a low-pressure chamber mounted circumferentially around the interior hollow space of the tire, said low-pressure chamber including a wall, at least part of which is flexible, to form a partitioned, closed space; a high-pressure chamber mounted, adjacent to the low-pressure chamber, circumferentially around the interior hollow space of the tire, the high-pressure chamber including a wall, at least part of which is flexible, to form a partitioned, closed space; a bulge portion mounted to the outer surface of the high-pressure chamber and normally urged, in a direction toward the rim to be pressed; and a control valve for the low-pressure chamber positioned between the service chamber and the low-pressure chamber, in communication with each other, wherein the communication therebetween is cut off when the air pressure of the low-pressure chamber reaches a predetermined pressure; a control valve for the high-pressure chamber enabling the communication between the high-pressure chamber and the low-pressure chamber to be possible depending on the decrease in the air pressure of the service chamber, while enabling the communication to be cut off when the air pressure of the high-pressure chamber reaches a predetermined pressure.

4 Claims, 3 Drawing Sheets

THREE-CHAMBER TIRE

BACKGROUND OF THE INVENTION

The present invention relates to a tire mounted to wheels of vehicles, airplanes and the like, and more particularly pertains to a three-chamber tire wherein internal space of a tubeless tire includes three divided air chambers, the air pressures of which are different from each other, thereby making such tubeless tires widely available to those of various kinds of transportation means and enabling them to stably and safely run even when they are punctured.

Conventionally, pneumatic tires have been generally used for an automobiles, although solid tires have been used, in some cases, for special vehicles such as construction vehicles. In most of such pneumatic tires, a tubeless tire wherein a soft rubber layer, comprising a high density rubber which is impervious to air, is mounted to the interior surface thereof.

Such a conventional tubeless tire is widely used, since it performs the functions of providing high stress resistance to a vertical or lateral load, a moving load such as driving torque or braking torque and the like, and providing isolation from road irregularities by acting as a spring, thereby giving a comfortable ride.

As has been well known, a conventional tubeless tire comprises one air chamber therewithin. For this reason, it has a problem in that, in the case where the tire treads on a nail and the like while the motor vehicle is running, leakage of air (hereinafter referred to as "a puncture") happens, which in turn may cause a grave traffic accident, a collision with a following car or a traffic snarl while exchanging the punctured tire to a spare tire and so forth.

Further, such a tubeless tire includes a bead, filled out by means of the compressed air in the air chamber thereof, pressed and mounted to a wheel rim (hereinafter referred to as "a rim"), thereby hermetically maintaining the compressed air therewithin. In this regard, in case of a puncture of a tire, the fit between the tire and the rim becomes loosely as the decrease in the air pressure of the air chamber thereof, so that the tire may come off from the rim, coupled with the excessive change of the lateral load, with the result that a serious accident may be brought about.

SUMMARY OF THE INVENTION

In view of the foregoing disadvantages inherent in the known types of tubeless tires now present in the prior art, the present invention has been achieved to solve them and it is an object of the present invention to provide a three-chamber tire which can prevent the tire from deforming and coming off from the rim due to the lateral load and the like, especially in case of the puncture while driving a motor vehicle.

Another object of the present invention is to provide a three-chamber tire which enables a vehicle to steadily and stably run and improves drivability with a puncture proof and safety thereof.

Still another object of the present invention is to provide a three-chamber tire which can prolong the longevity thereof.

Yet another object of the present invention is to provide a three-chamber tire adapted to the diversified uses of the tire.

It is a further object of the present invention to provide a three-chamber tire which is easy to be assembled.

To attain the above-mentioned objects, a three-chamber tire according to one preferred mode of the present invention comprises a tire body including a bead mounted to a rim and an interior hollow space therewithin to form a service chamber; a low-pressure chamber mounted circumferentially around the interior hollow space of the tire, said low-pressure chamber including a wall, at least part of which is flexible, to form a partitioned, closed space; a high-pressure chamber mounted, adjacent to said low-pressure chamber, circumferentially around the interior hollow space of the tire, said high-pressure chamber including a wall, at least part of which is flexible, to form a partitioned, closed space; a bulge portion mounted to the outer surface of said high-pressure chamber and normally urged, in a direction toward said rim to be pressed; and a control valve for said low-pressure chamber positioned between said service chamber and said low-pressure chamber, in communication with each other, wherein the communication therebetween is cut off when the air pressure of said low-pressure chamber reaches a predetermined pressure; a control valve for said high-pressure chamber enabling the communication between said high-pressure chamber and said low-pressure chamber to be possible depending on the decrease in the air pressure of said service chamber, while enabling said communication to be cut off when the air pressure of said high-pressure chamber reaches a predetermined pressure.

Because the three-chamber tire according to the present invention includes the air chamber of the pneumatic tire divided into three rooms and the bulge portion having the bead normally urged toward the rim, in the case of a puncture at the tire body, deformation of the tire and detachment thereof from the rim, due to the external forces such as a lateral load, can be prevented, so that the vehicles can run continuously and stably due to the functions of the low-pressure chamber and/or the high-pressure chamber, which are not affected by a puncture.

DERAILED DESCRIPTION OF THE PREFERRED EMBODIMENT

Preferred embodiment of the present invention will now be described in detail with reference to the accompanying drawings. For the sake of simplicity and clarity of explanation, the composing elements of the present invention, such as the control valves, according to each drawing are virtual ones, assuming that they are positioned on the same plane.

Figure 1:
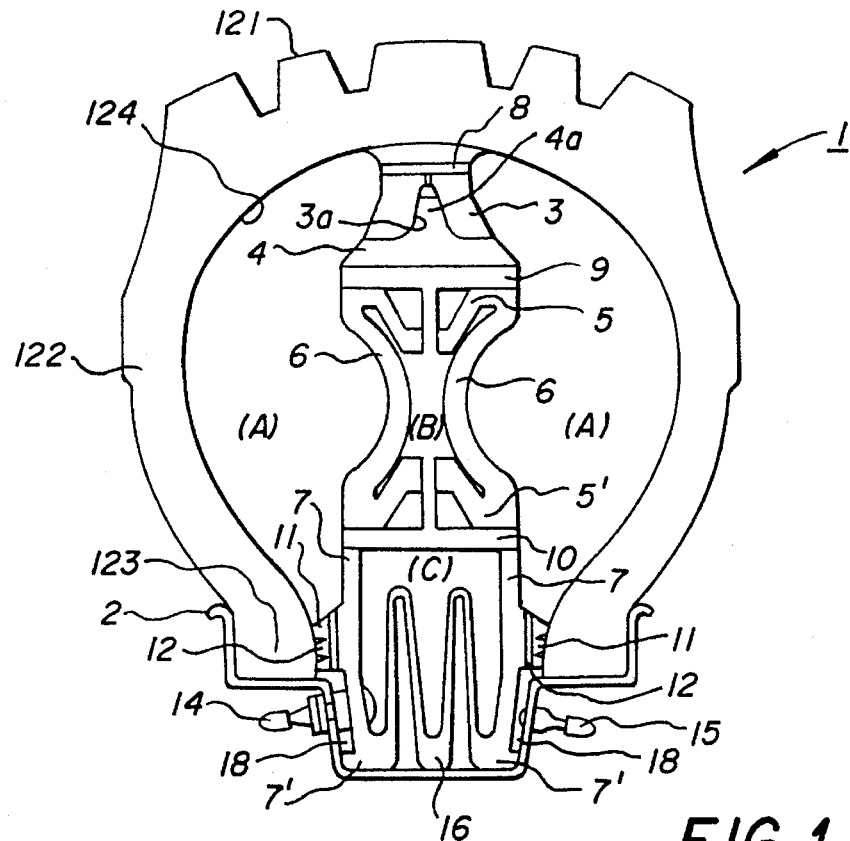
FIG. 1 is a fragmentary cross-sectional view of the first embodiment of the three-chamber tire according to the present invention.

FIG. 1 is a fragmentary cross-sectional view of the first embodiment of the three-chamber tire according to the present invention.

Basically, the tire body 1 uses a tubeless tire which is publicly known. That is, as shown in FIG. 1, the tire body 1, formed in a generally round shape in section, comprises a tread 121, or a road-contacting part made of thick rubber, which has various grooves that helps reduce skid, aids in radiation of heat, and in prevention of enlarging of cracks; a side wall portion 122, bulged outwardly to form a circular arc shape; a bead 123, formed at each side of the central bottom of the tire, which projects inwardly so that deformation of the tire and detachment thereof from the rim can be prevented; and a soft rubber ply 124, mounted to the inner surface of the tire body 1, for hermetically maintaining the compressed air therewithin.

An inner rib 3 is mounted, extending inwardly from an inner surface of the tire body 1 and extending circumferentially around the tire, to the inner surface of the tread 121 at the center portion thereof, with respect to the width direction. A groove 3a is formed circumferentially around the tire, at the tip portion of the inner rib 3, in which formed are a suitable number of intercommunicating bores 8, elongated in a lateral direction of the tire to communicate between both sides of service chambers A (as will be describe later), at equal intervals in a circumferential direction of the tire. It is preferable that the inner rib 3 is formed integrally with the tire body 1, but they may be made separately from each other and fixed therebetween by means of a glue and the like.

A low-pressure chamber B and high-pressure chamber C are formed, as described hereunder, between the tip of the inner rib 3 and a recess portion, formed at a laterally central portion of the rim 2.

As shown in FIG. 1, the low-pressure chamber B includes sectionally trapezoid-like, outer and inner central partitions 5, 5', and right and left side walls 6 connected, having appropriate elasticity and rigidity, to the outer and inner central partitions 5, 5' to form a closed pressure room, which extends circumferentially around the tire. The outer central partition 5 includes a low-pressure chamber fixing portion 4, mounted integrally thereto at the outer end thereof and having a projecting portion 4a at its tip portion which is fitted into the groove 3a of the inner rib 3. The low-pressure fixing portion 4 includes an aperture 9, elongated in a lateral direction of the tire, in which a control valve for a low-pressure chamber VB (as will be described later) is positioned, at a lower end thereof adjacent to the outer central portion 5.

As shown in FIG. 1, the high-pressure chamber C, mounted adjacent to the interior end of the low-pressure chamber B, includes a inner partition 16 at the interior end thereof (central portion of the tire), comprising a bellows which facilitates the mounting thereof to the rim 2, right and left side walls 7, and the inner central partition 5' to form a closed pressure room, which extends circumferentially around the tire. An aperture 10 is formed, elongated in a lateral direction of the tire, at the outer end of the high-pressure chamber C (as will be described later), adjacent to the inner end of the inner central partition 5', so that a control valve for a high-pressure chamber VC is positioned therewithin.

Bulge portions 11, extending outwardly and circumferentially around the tire, are mounted integrally on both sides of the right and left side walls 7, 7 of the high-pressure chamber C, and are arranged between the side walls 7 and the beads 123, normally urged, in a direction toward the interior surface of the beads 123 thereby pressing beads 123 against rim 2. In addition, detents 7', projecting outwardly, are formed at the bottom of each side wall 7, so that a space 18 between the interior surface of the rim 2 and the outer surface of the side walls 7 can be formed, by means of elasticity of the bulge portion 11, when the inner partition 16 is fitted in the recess portion of the rim 2. Further, a plurality of intercommunicating bores 12, through which the foregoing space 18 of each side and the service chamber A are communicating therewith, are formed at the bulge portions 11. Still further, as shown in FIG. 1, not only mounted on both sides of the wall of the recess portion of the rim 2 is an air supply valve for service chamber 13, through the space 18 and the intercommunicating bores 12, for supplying air for the service chamber A, but also is a air supply valve for high-pressure chamber 14 for directly supplying air for the high-pressure chamber C.

The low-pressure chamber fixing portion 4, the low-pressure chamber B, the high-pressure chamber C, and the bulge portion 11, each portion of which must have suitable elasticity and rigidity thereof, are integrally formed by means of vulcanizing forming, in which a carcass or a core box is used in order to form a hollow portion, thereby forming a pressure chamber block P. The pressure chamber block P, constructed as described above, is arranged inside the tire body 1 and mounted thereon, in such a manner that the projecting portion 4a of the chamber fixing portion 4 is fitted into the groove 3a of the inner rib 3, then the component of high-pressure chamber C, including the inner partition 16 with a bellows and both side walls 7 with the bulge portions 11, is fitted into the recess portion of the rim 2 and the beads 123. As will be apparent from the foregoing, according to the present invention, three air chambers are formed inside the tire body 1; the low-pressure chamber B and the high-pressure chamber C are formed in the pressure chamber block P while the service chambers A of both sides are formed at between the pressure chamber block P and the side walls 12 of the tire body 1.

Next, one preferred embodiment of the control valve for low-pressure chamber VB and the control valve for high-pressure chamber VC according to the present invention will now be described with reference to FIGS. 4(a), 4(b), and FIG. 5.

Figure 4A:
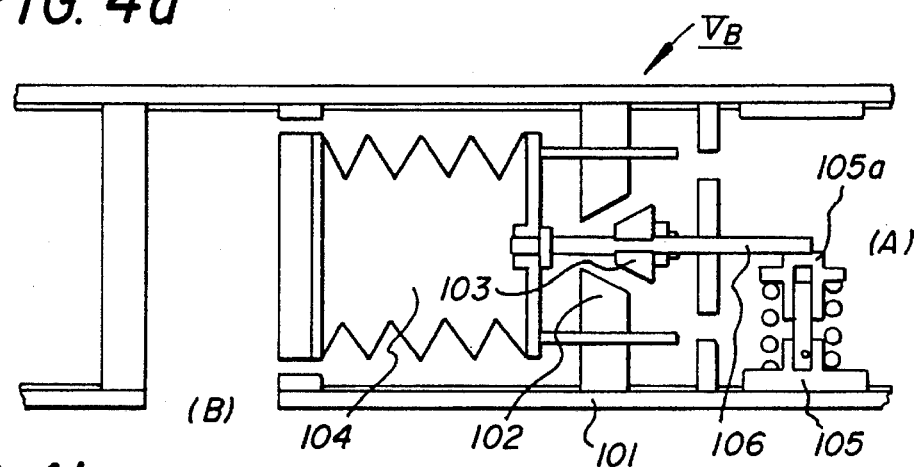
FIG. 4a is an illustrative cross-sectional view of the control valve for the low pressure chamber with the valve in an opening condition.
Figure 4B:
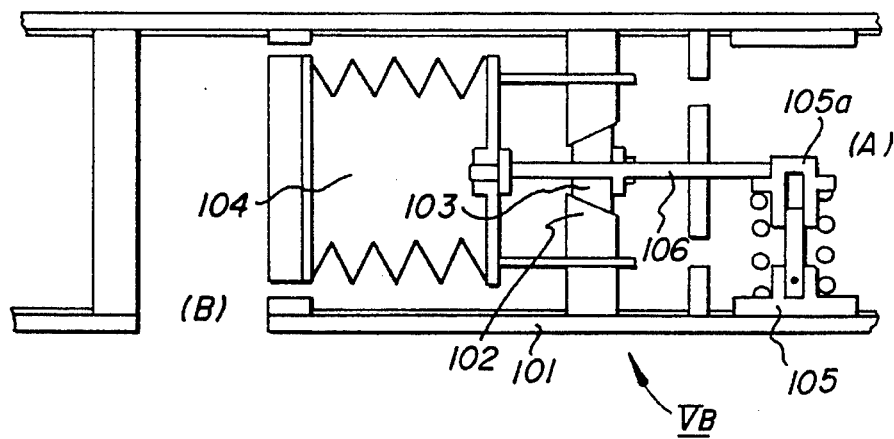
FIG. 4b is an illustrative cross-sectional view of the control valve for the low pressure chamber with the valve in a closed condition.

FIG. 4(a) shows the control valve for low-pressure chamber VB, for controlling the air pressures of the service chamber A and the low-pressure chamber C, in an opening condition while FIG. 4(b) shows the same in a cut-off condition.

The low-pressure chamber VB according to this embodiment comprises a diaphragm valve 104, disposed in whole within the aperture 9, which operates depending on the pressure differential between the service chamber A and the low-pressure chamber B; a valve rod 106 slidably reciprocating, actuated by the diaphragm valve 104, with respect to the width direction of the tire; a bevel valve 103 mounted to the valve rod 106; a valve seat 102, having a taper bore disposed at the central portion thereof, for hermetically receiving the bevel valve 103 therethrough; and a locking means 105, having a stepped stopper 105a which is normally urged upwardly (as viewed in FIG. 4(a),(b)) by a coil spring, for locking the bevel valve 103 which prevents the air of the low-pressure chamber from flowing into the service chamber A in a cut-off condition as shown in FIG. 4(b).

Figure 5:
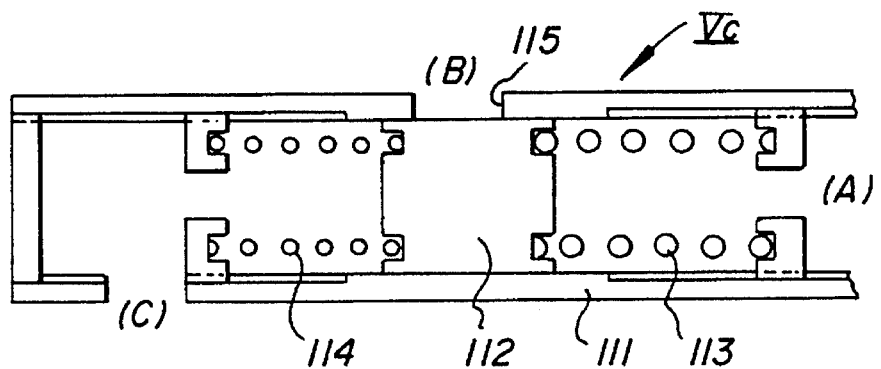
FIG. 5 is an illustrative cross-sectional view of the control valve for the high-pressure chamber.

FIG. 5 is an illustrative cross-sectional view of the control valve for the high-pressure chamber VC for controlling each air pressure of the service chamber A, the low-pressure chamber B, and the high pressure chamber C.

As shown in FIG. 5, the control valve for the high-pressure chamber VC, according to this embodiment, disposed in whole within the aperture 10, comprises a piston valve 112, slidably reciprocating with respect to the width direction of the tire, actuated not only by the pressure differential of the chambers between the service chamber A and the high-pressure chamber C, but also by the compression differential between the coil spring 113 and the coil spring 114. Further, a port 115 is formed on the aperture 10 at the outer central portion adjacent to the low-pressure chamber B, wherein an air inflow from the high-pressure chamber C to the low-pressure chamber B can be allowed therethrough by the rightward movement, as viewed in FIG. 5, of the piston valve 112.

Next, operation of the three-chamber tire having such a structure according to one embodiment of the present invention will now be described.

When the air first begins to be supplied from the air supply valve for service chamber 13 to the service chamber A, through the space 18 and the intercommunicating bore 12 in a normal condition, the control valve for low-pressure chamber VB is in an open condition, wherein the bevel valve 103 is positioned separately from the valve seat 102, as shown in FIG. 4(b), so that the air can be supplied for the low-pressure chamber B through the opening therebetween. As the air is supplied for the low-pressure chamber B, the air pressure of the service chamber A rises. When the air pressure reaches a predetermined pressure of the low-pressure chamber, the bevel valve 103 is slidably moved, by the operation of the diaphragm valve 104, to close the opening of the valve seat 102, as shown in FIG. 4(b), wherein the valve rod 112 is locked by the locking means 105 in a cut-off position, so that the air can be automatically shut up in the low-pressure chamber B hermetically. Under this condition, air is supplied only for the service chamber A and continues to be supplied until the air pressure of the service chamber A reaches the predetermined pressure thereof.

On the other hand, air continues to be supplied, through the air supply valve for high-pressure chamber 14, for the high-pressure chamber C until the air pressure therewithin reaches the predetermined pressure, where the piston valve 112 is held in a balanced position.

The values of each air pressure of the foregoing three chambers A, B, and C are adjusted, so that the air pressure value of the high-pressure chamber A is highest while that of the low-pressure chamber B is lowest among the three chambers. The air pressure value of the low-pressure chamber B may be changed, depending on the type of the motor vehicles and the like; for example, the air pressure of the low-pressure chamber B of an automobile is kept low, which gives the tire flexibility and facilitates an comfortable driving, while that of a cargo-handling vehicle such as a truck is kept high, which gives the tire strength and facilitates pressure tightness. In this way, the three-chamber tire according to this invention can be more widely available.

Next, operation of the three-chamber tire in case of puncture, according to this embodiment of the present invention, will now be described.

Figure 2:
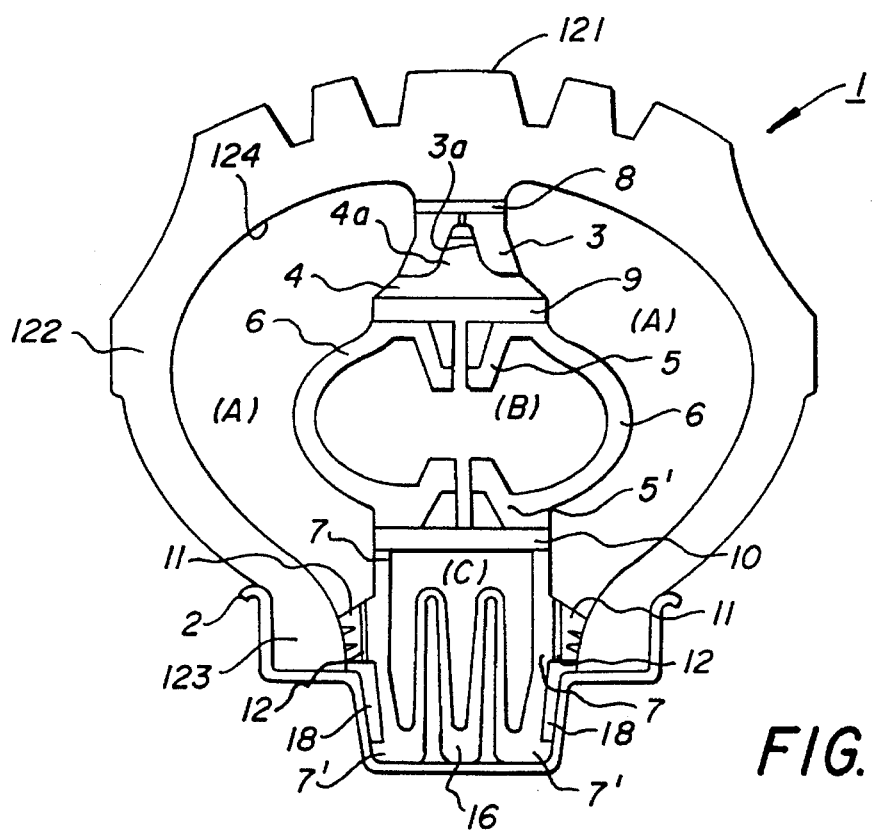
FIG. 2 is a sectional view of the three-chamber tire of FIG. 1 showing the interior of the tire body in an puncture condition where the air pressure of the service chamber is minimum.

FIG. 2 is a sectional view of the three-chamber tire showing the interior of the tire body in an puncture condition. When the tire body 1 gets punctured, the air pressure of the service chamber A begins to decrease. As the air pressure of the service chamber A goes down, the piston valve 112 is moving rightward, as viewed in FIG. 5. Thereafter, the port 115 is opened and the compressed air flows from the high-pressure chamber C to the low-pressure chamber B, so that the air pressure of the high-pressure chamber C decreases while that of the low-pressure chamber B increases. The foregoing air inflow continues until a predetermined pressure of the air pressure value of the control valve for high-pressure chamber VC, the operation of which is determined by the elastic modulus of the two coil springs 113 and 114 as well as the pressure differential between the two pressure chambers C and B, with the result that the piston valve 112 begins to be moved leftward, as viewed in FIG. 5, and finally cut off the port 115. As will be apparent from the foregoing, FIG. 2 shows the puncture condition where the air pressure of each service chamber A and the low-pressure chamber C is minimum while that of the low-pressure chamber B is maximum. In this condition, the low-pressure chamber B and the high-pressure chamber C support the load with which the tire is burdened. The bulge portion 11, compressed by the high-pressure chamber C, pushes the bead 123, which in turn is compressed between the bulge portion 11 and the rim 2, thereby preventing the tire from deforming and coming off from the rim 2.

Figure 3:
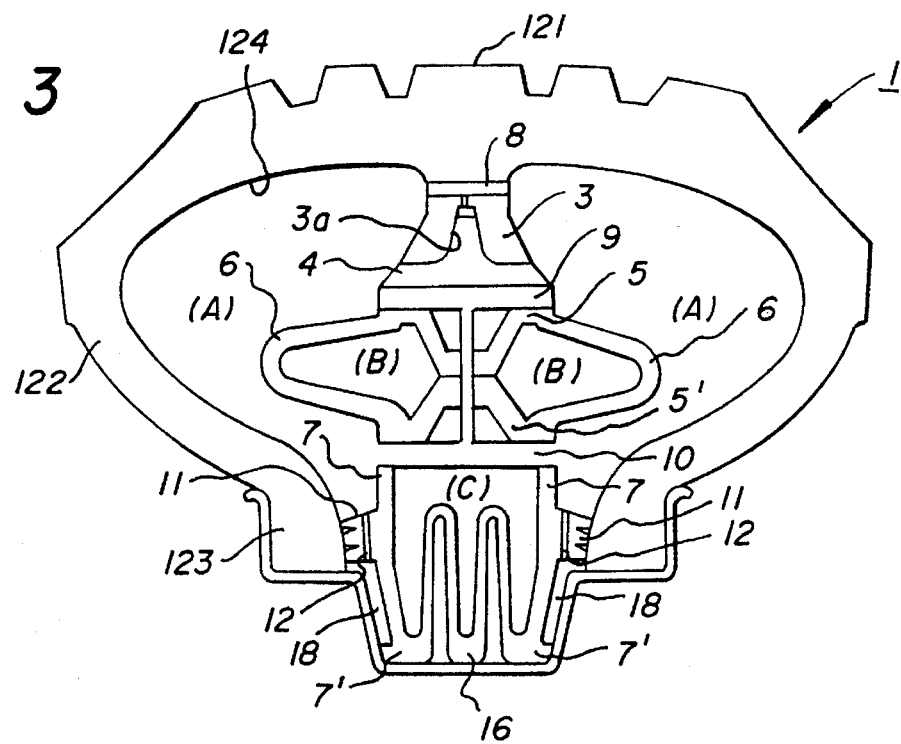
FIG. 3 is a sectional view of the three-chamber tire of FIG. 1 showing the interior of the tire body in a further puncture condition where the low-pressure chamber has a puncture as well, wherein the air pressures of both the service chamber and the low-pressure chamber are minimum.

FIG. 3 shows the interior of the tire body in a further puncture condition, advancing from that of FIG. 2, where the low-pressure chamber has a puncture as well. In this condition, the outer and inner central partition 5 and 5' are abutted with each other at the central portion thereof, wherein the high-pressure chamber C directly supports the load with which the tire is burdened. In this case, like the foregoing, the bulge portion 11, compressed by the high-pressure chamber C, pushes the bead 123, which in turn is compressed between the bulge portion 11 and the rim 2, thereby preventing the tire from deforming and coming off from the rim 2. Therefore, even under this condition, a vehicle equipped with the three-chamber tire according to the present invention can steadily and stably run.

Figure 6:
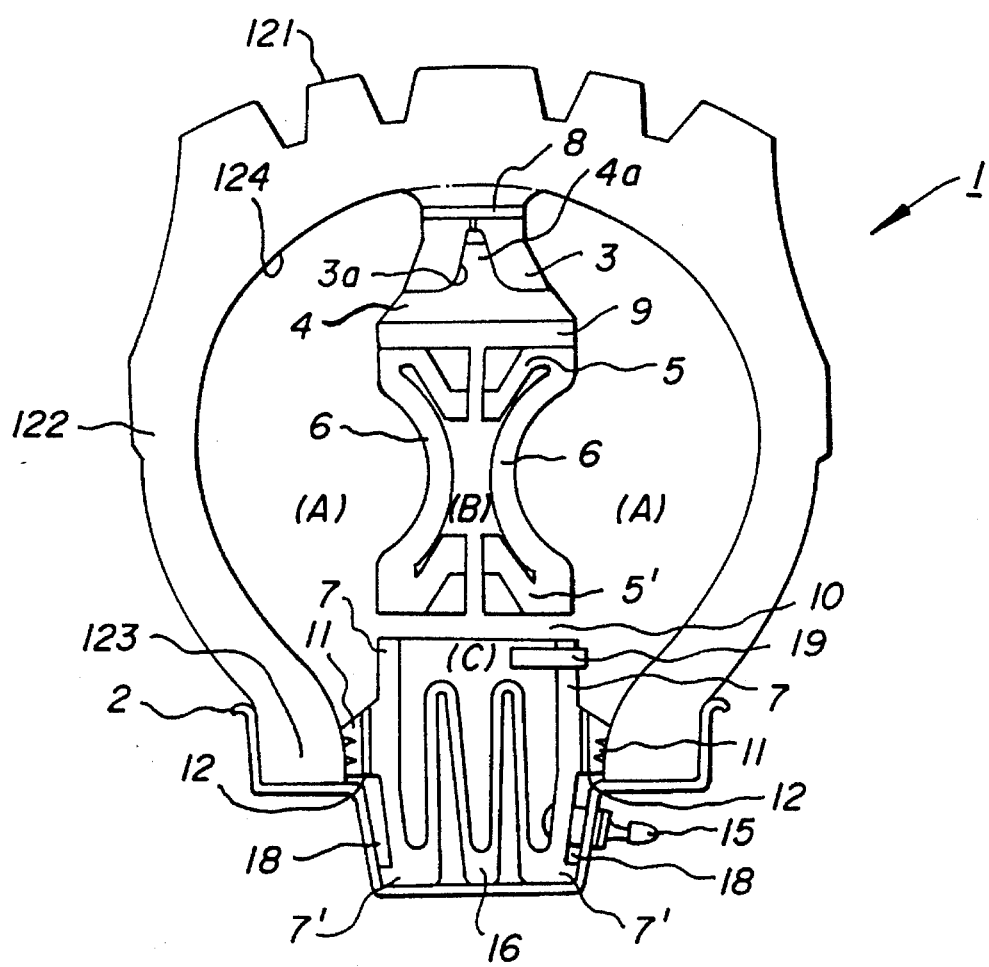
FIG. 6 is a fragmentary cross-sectional view of a modified form of the three-chamber tire according to the present invention.

FIG. 6 shows a fragmentary cross-sectional view of a modified form of the three-chamber tire according to the present invention.

As shown in FIG. 6, the three-chamber tire of this embodiment is basically constituted as the same manner as that of the foregoing embodiment, except that the three-chamber tire of this embodiment includes only a air supply valve for high-pressure chamber 15, removing the air supply valve for service chamber 13 from the apparatus, through which the air is supplied to the high-pressure chamber C; and a control valve 19, which is similarly constituted as the control valve for the low-pressure chamber VB, mounted to the position between the high-pressure chamber C and the service chamber A.

While the instant invention has been shown and described with specific reference to embodiments presently contemplated as the best mode of carrying out the invention in actual practice, it is to be understood that various changes may be in adapting the invention to different embodiments without departing from the broader inventive concepts disclosed herein and comprehend by the claim which follow.

What is claimed is:

1. A three-chamber tire, comprising:
   a tire body including a bead mountable to a rim of a wheel and an interior hollow space therewithin to form a service chamber;

a high-pressure chamber mounted, circumferentially around said interior hollow space of the tire and extending outwardly from a central portion of the wheel, said high-pressure chamber including a wall, at least part of which is flexible, to form a partitioned, closed space;

a low-pressure chamber mounted circumferentially around said interior hollow space of the tire, adjacent said high pressure chamber and extending outwardly therefrom, said low-pressure chamber including a wall, at least part of which is flexible, to form a partitioned, closed space;

a bulge portion mounted on an outer surface of said high-pressure chamber and normally biased, in a direction outwardly toward said rim thereby pressing said tire bead against said rim;

a control valve for said low-pressure chamber being positioned between said service chamber and said low-pressure chamber, in communication with each other, wherein the communication therebetween is cut off when the air pressure of said low-pressure chamber reaches a predetermined pressure; and a control valve for said high pressure chamber enabling the communication between said high pressure chamber and said low-pressure chamber, depending on the decrease in the air pressure of said service chamber, such that said communication is cut off when the air pressure of said high-pressure chamber reaches a predetermined pressure.

2. A three-chamber tire as recited in claim 1, wherein said low-pressure chamber, said high-pressure chamber, and said bulge portion are integrally formed into a pressure chamber block, said pressure chamber block being mounted in said interior hollow space between an interior surface of a tread and said rim.

3. A three-chamber tire as recited in claim 1, wherein said three-chamber tire further comprises an air supply valve for said service chamber and an air supply valve for said high-pressure chamber.

4. A three-chamber tire as recited in claim 1, wherein said three-chamber tire further comprises an air supply valve for said high-pressure chamber and a control valve in communication between said high pressure chamber and said service chamber for controlling the air pressure between said high-pressure chamber and said service chamber.

* * * * *